United States Patent [19]

Kazino et al.

[11] Patent Number: 4,674,344

[45] Date of Patent: Jun. 23, 1987

[54] ENGINE STARTER

[75] Inventors: Sadayosi Kazino; Naoki Yoshikawa, both of Nagoya, Japan

[73] Assignee: Nippondenso Co., Ltd., Kariya, Japan

[21] Appl. No.: 792,009

[22] Filed: Oct. 28, 1985

[30] Foreign Application Priority Data

Nov. 8, 1984 [JP] Japan ............................... 59-236317

[51] Int. Cl.[4] ...................... F02N 15/06; H02K 11/00

[52] U.S. Cl. .................................. 74/7 A; 290/38 R; 290/48; 310/68 C; 361/29; 361/164; 335/131

[58] Field of Search ............................ 74/7 A, 7 R, 6; 290/38 C, 38 R, 48; 337/380; 335/131; 310/68 C; 123/179 B; 318/473; 361/163, 29, 164, 32

[56] References Cited

U.S. PATENT DOCUMENTS

| | | | |
|---|---|---|---|
| 2,369,986 | 2/1945 | Schaefer | 318/473 |
| 2,539,179 | 1/1951 | Bevis et al. | 361/164 |
| 3,084,561 | 4/1963 | Mattson | 290/38 R |
| 3,177,728 | 4/1965 | Farison | 74/7 A |
| 3,694,717 | 9/1972 | Prouty et al. | 361/29 |
| 4,236,092 | 11/1980 | DiFlora | 310/68 C |
| 4,389,692 | 6/1983 | Sander et al. | 310/68 C |
| 4,503,347 | 3/1985 | Bergman | 310/68 C |

*Primary Examiner*—Cornelius J. Husar
*Assistant Examiner*—Peter M. Cuomo
*Attorney, Agent, or Firm*—Cushman, Darby & Cushman

[57] ABSTRACT

An engine starter has a plunger electromagnetically actuated by holding and attracting coils to move a pinion toward a ring gear on the engine and also to move a first movable contact on the plunger towards first and second stationary contacts to be electrically connected together by the first movable contact to electrically energize a starter motor. A relay is provided and has normally open contacts electrically connected in series to a power source and the connection between the holding and attracting coils. The relay coil is connected in series to a starter switch and a temperature sensor. The temperature sensor is formed by a normally closed switch having a third stationary contact connected to the relay coil, and a bimetallic element carrying a second movable contact grounded through the bimetallic element. The temperature sensor is disposed to detect the temperature of one of the holding and attracting coils and arranged such that, when the temperature is raised to a predetermined level, the bimetallic element snaps to separate the second movable contact from the third stationary contact whereby the electrical supply to the holding and attracting coils is interrupted to interrupt the electrical supply to the starter motor. Thus, the starter will not burn up if the starter switch remains closed.

12 Claims, 10 Drawing Figures

ENGINE STARTER

FIELD OF THE INVENTION

The present invention relates to a starter for an internal combustion engine.

DESCRIPTION OF THE PRIOR ART

An example of the prior art engine starter is disclosed in JOURNAL OF NIPPONDENSO TECHNICAL DISCLOSURE, No. 36-070, published July 15, 1984. As shown in the prior publication cited above, the prior art starter has a self-heating bimetallic element connected electrically in series to a starter switch and adapted to be moved into contact with a first stationary contact electrically connected to a point of connection between attracting and holding coils which form exciting coils for a plunger. The starter switch is connected to an electrical power source formed by a battery. When electrical current has passed through the bimetallic element and the holding coil to a starter motor for a predetermined time period, the bimetallic element is heated to a predetermined temperature level. The predetermined temperature level is sufficiently high enough to cause the bimetallic element to snap away from the first stationary contact into electrical contact with a second stationary contact which is grounded through a resistor. Heat is produced continuously in the bimetallic element by the electrical current continuously passing through the bimetallic element. Thus, the bimetallic element is kept separated from the first stationary contact so long as the starter switch is kept closed. This advantageously prevents the starter motor from being damaged by overheating or overrun which would otherwise be caused when the starter switch accidentally fails to be opened.

In the prior art starter, however, electrical current from a DC power source of 12 V will flow at 20 A through the holding coil and at 160 A through the attracting coil. This is because the bimetallic element is electrically connected to the point of connection between the holding and attracting coils. Thus, there is a large difference in amperes between the currents passing through the attracting and holding coils. Accordingly, if the capacity of the bimetallic element, i.e., the temperature level at which the bimetallic element snaps after the current has passed therethrough for a certain time period, is determined on the basis of the current passing through the holding coil, the snapping of the bimetallic element will take place in a very short period of time. Thus, the plunger cannot be electromagnetically driven. To the contrary, if the capacity of the bimetallic element is determined based on the current flowing through the attracting coil, the bimetallic element will not snap, so that the current will continuously pass through the holding coil until the holding coil would possibly be damaged. In addition, prior art starters require, two stationary contacts, i.e., the first and second stationary contacts associated with the bimetallic element. This disadvantageously increases the size of the temperature sensor formed by the bimetallic unit of the prior art.

SUMMARY OF THE INVENTION

The present invention has its object to eliminate the problems and shortcomings of the prior art discussed above.

The present invention provides an engine starter which includes:

a starter switch electrically connected to an electric power source;

a pinion axially movable into and out of meshing engagement with the ring gear;

a plunger for moving the pinion towards the ring gear and having a first movable contact at one end;

first and second stationary contacts both so positioned as to be contacted by the first movable contact;

exciting coil means for moving the plunger towards the first and second stationary contacts, the exciting coil means comprising a first holding coil and a second attracting coil;

a starter motor adapted to be energized when the first contact is moved into contact with the first and second stationary contacts to electrically connect them together, the starter motor being drivingly connected to the pinion;

a temperature sensor for detecting the temperature of one of the first and second coils;

the first and second coils having windings electrically connected in series at their one ends;

a relay including normally open contacts electrically connected in series to the electrical power source and the connection between the windings of the first and second coils and a third coil electrically connected in series to the starter switch and the temperature sensor and adapted to be energized when the starter switch is turned on to close the normally open contacts;

the temperature sensor being electrically connected in series to the third coil and a ground, and comprising a third stationary contact, a bimetallic element having a second movable contact electrically connected to the bimetallic element and so positioned as to be moved by the bimetallic element into and out of contact with the third stationary contact, and an electrically energizable heater disposed in heat conductive relationship with the bimetallic element, the bimetallic element being disposed adjacent to the one of the first and second coils and operative to move the second movable contact away from the third stationary contact when the one of the first and second coils is heated to a first predetermined temperature level, to deenergize the third coil whereby the normally open contacts of the relay are opened to interrupt the electrical supply from the power source to the starter motor.

As stated above, the bimetallic element of the temperature sensor is disposed adjacent to one of the first and second coils of the plunger exciting coil means. In addition, the temperature sensor is electrically connected in series to the relay coil and the ground. Thus, the temperature level at which the bimetallic element snaps can advantageously easily be set on the basis of the temperature level to which the one of the first and second coils of the exciting coil means is heated after the energization thereof for a predetermined time period.

The present invention also provides an engine starter which include a starter switch; a magnetic switch operative when the starter switch is turned on and including exciting coil means; a starter motor electrically connected to the magnet switch for driving the engine; a temperature sensor for detecting the temperature of the exciting coil means, the temperature sensor being operative to interrupt the electrical supply to the starter motor when the temperature of the exciting coil means is raised to a predetermined level; and a retainer member operative to hold the temperature sensor in position adjacent to the exciting coil means and being shaped such that a space is left between the temperature sensor and the retainer member. The space is effective to advantageously thermally isolate the temperature sensor from the roof or bottom of the recess.

The above and other objects, features and advantages of the present invention will be made more apparent by the following description of preferred embodiments of the invention with reference to the accompanying drawings.

DESCRIPTION OF PREFERRED EMBODIMENTS

Figure 1:
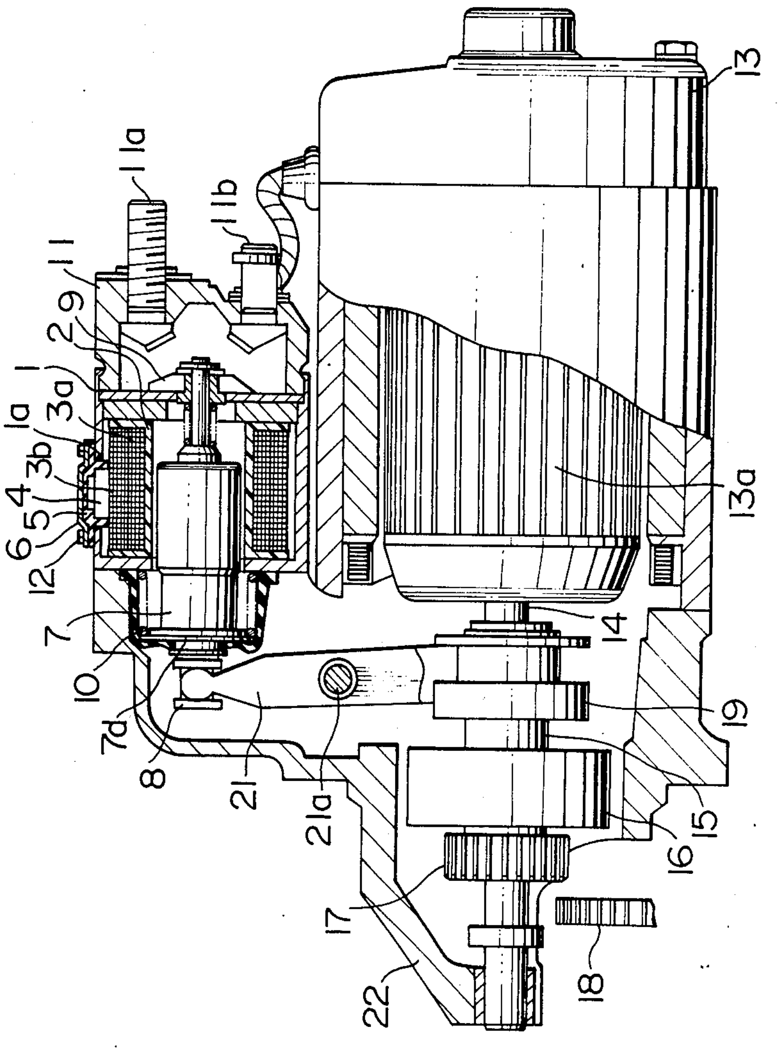
FIG. 1 is a partly sectional front elevation of an embodiment of a starter according to the present invention.

Referring to FIG. 1 of the drawings, an engine starter includes a motor 13 having an armature 13*a* mounted on a shaft 14 for rotation therewith. The shaft 14 is rotatably supported at one end by a motor housing and at the other end by a starter housing 22 and carries a spline tube 15 mounted for rotation with the shaft 14 and for axial movement with respect to the shaft 14. A unidirectional clutch 16 is mounted on the outer periphery of the spline tube 15 axially outwardly of a retainer 19 formed on the outer peripheral surface of the spline tube 15. A pinion 17 is rotatably mounted on the shaft 14 between the said other end thereof and the unidirectional clutch 16 and adapted to be drivingly connected to and disconnected from the spline tube 15 by the operation of the unidirectional clutch 16.

A lever 21 is pivotally mounted by a pivot pin 21*a* on the starter housing 22 and has an end engaged with a joint section 8 of a plunger 7 to be described later. The other end of the lever 21 is slidably engaged with an annular groove in the outer peripheral surface of the retainer 19 so that, when the lever 21 is pivotally moved by the plunger 7 in clockwise direction as viewed in FIG. 1, the spline shaft 15 is axially moved on the shaft 14 leftwards as viewed in FIG. 1 to bring the pinion 17 into contact with a ring gear 18 of an associated internal combustion engine (not shown) to start the operation thereof.

The plunger 7 is axially movably mounted in an annular bobbin 2 which is housed in a plunger casing 1 which in turn is mounted on the starter housing 22. The plunger 7 has an annular flange 7*d* adjacent to the joint section 8 of the plunger. A return spring 10 formed by a compression coil spring extends around the plunger 7 and between the flange 7*d* and one end of the casing 1. The end of the plunger 7 remote from the joint section 8 carries a movable contact 9 movable with the plunger 7 into and out of electrically conductive engagement with first and second stationary contacts 11*a* and 11*b* mounted on a magnet switch casing 11 fixed to the other end of the plunger casing 1.

The plunger casing 1 has a generally cylindrical outer peripheral wall a part of which is exposed at the top of the starter. A rectangular hole or opening 1*a* is formed in the exposed top of the plunger casing 1. A switch 4 is mounted in the hole 1*a* by means of a retainer member 5 and a cover member 6, as will be described in more detail later. Inner attracting coil 3*a* and an outer holding coil 3*b* are wound on the bobbin 2 and enclosed by the plunger casing 1, as shown in FIG. 1. One end of the winding of the holding coil 3*b* is grounded.

Figure 2:
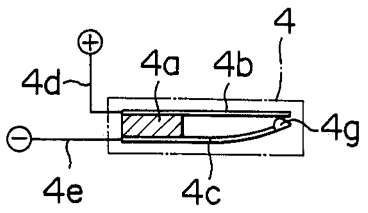
FIG. 2 is a diagrammatic illustration of the structure of a normally closed switch incorporated into the starter shown in FIG. 1.

The switch 4 is of normally closed type and forms a temperature sensor. The switch 4 may be formed, for example, by the self-holding, plastic type thermal protector manufactured by Matsushita Electric Industrial Co., Ltd., Japan. The switch 4 includes a third stationary contact 4*b* connected by a lead 4*d* to a plus terminal, and a bimetallic element 4*c* disposed in substantially parallel relationship with the stationary contact 4*b* and connected by another lead 4*e* to a minus terminal, as shown in FIG. 2. A heater formed by a PTC element 4*a* is disposed between one ends of the stationary contact 4*b* and the bimetallic element 4*c*. A movable contact 4*g* is secured to the free end of the bimetallic element 4*c* and normally held in electrically conductive engagement with the free end of the stationary contact 4*b* to close a circuit.

Figure 4A:
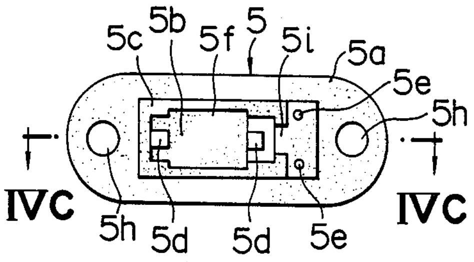
FIG. 4A is a bottom view of a retainer member incorporated into the starter to retain the normally open switch on a plunger casing.
Figure 4B:
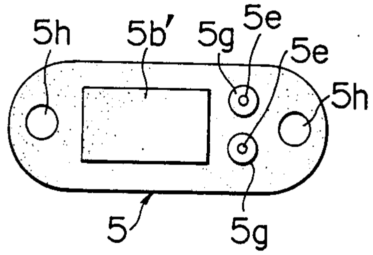
FIG. 4B is a top plan view of the retainer member.
Figure 4C:
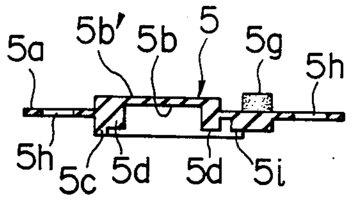
FIG. 4C is a section of the retainer member taken along line IVC—IVC in FIG. 4A.

Referring to FIGS. 4A, 4B and 4C, the retainer member 5 by which the switch 4 is mounted on the plunger casing 1, as described previously, is formed from an elastomeric material such as rubber and includes an outer peripheral flange section 5*a* of an arcuate cross-section suited for intimate and sealing engagement with the cylindrical outer surface of the plunger casing 1. A rectangular recess 5*b* is formed in the inner side of the retainer member 5 centrally thereof to receive and retain the switch 4 in the manner shown in FIG. 1. The retainer member 5 is mounted on the plunger casing 1 with the recess 5*b* faced inwardly. A guide section 5*c* is formed by a rectangular projection or bead disposed outwardly of and surrounding the rectangular recess 5*b*. The guide section 5*c* projects into the opening 1*a* in the plunger casing 1. A pair of protrusions 5*d* are formed integrally with the two opposed shorter sides of the rectangular recess 5*b*. A pair of generally cylindrical projections 5*g* are formed on the outer side of the retainer member 5 in the flange section 5*c* thereof. The projections 5*g* are formed therein with through-holes 5*e* for the leads 4*d* and 4*e* of the switch 4. The recess 5*b* is laterally enlarged by notches or cutouts 5*f* formed in the longer sides of the recess 5*b*. A pair of screw holes 5*h* are formed in the longitudinal end portions of the flange 5*a*. The rectangular guide section 5*c* is slightly cut or recessed at 5*i* between one of the protrusions 5*d* and the lead holes 5*e* to provide a recess or groove for the leads 4*d* and 4*e* extending from the switch 4 in the recess 5*b* to the lead holes 5*e*.

Figure 5:
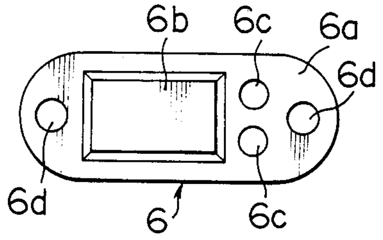
FIG. 5 is a bottom view of a cover member for the retainer member.

Referring to FIG. 5, the cover member 6 by which the retainer member 5 is fixed to the plunger casing 1 is formed of a metal and serves to protect the retainer member 5. The cover member 6 is disposed in superposed relationship with the retainer member 5, as will be seen in FIG. 1 and, for this reason, includes an outer flange section 6a extending in face-to-face engagement with the flange 5a of the retainer member 5, a recess 6b snugly receiving the top or roof 5b' of the recess 5b of the retainer member 5, a first pair of through-holes 6c through which the projections 5g of the retainer member 5 extend outwardly, and a second pair of holes 6d formed in the flange section 6a in alignment with the screw holes 5h in the retainer member 5.

Figure 7:
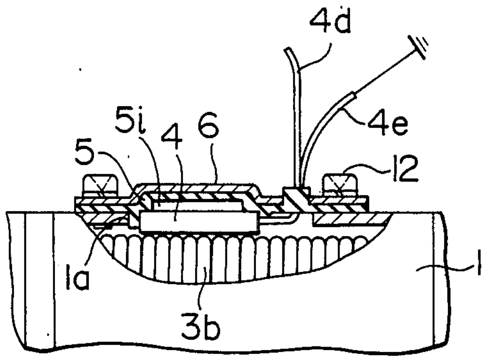
FIG. 7 is an enlarged fragmentary side view of a plunger casing with a part thereof cut away to show a part of a holding coil, the normally open switch, the retainer member and the cover member.

In mounting the switch 4 on the plunger casing 1, the switch 4 is fitted into the recess 5b in the retainer member 5 with the two leads 4d and 4e extending from the switch 4 through the groove 5i in the guide section 5c into and through the lead holes 5e. Then, the assembly of the retainer member 5 and the switch 4 is mounted on the plunger casing 1 with the guide section 5c fitted into the opening 1a. Thereafter, the cover member 6 is placed on the retainer member 5 and then fixed with the retainer member to the plunger casing 1 by means of screws 12, as shown in FIG. 1. At this time, the resiliency of the projections 5d urges the switch 4 resiliently into thermally conductive engagement with the outer peripheral surface of the outer holding coil 3b, as best seen in FIG. 7. However, a space 5j is formed between the switch 4 and the inner surface of the roof of the recess 5b of the retainer member 5 to thermally isolate the outer surface of the switch 4 from the roof of the recess 5b of the retainer member 5. The cylindrical projections 5g of rubber prevent the leads 4d and 4e therein from being broken by repeated flexion. The retainer member 5 also serves to seal the opening 1a against water, dusts and so forth.

Figure 6:
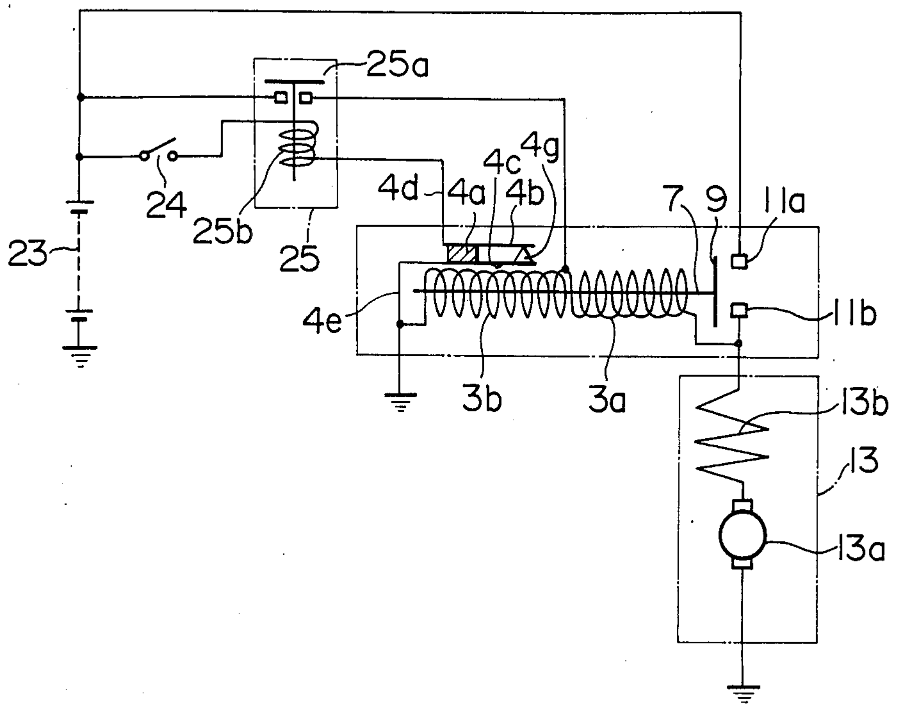
FIG. 6 is an electrical circuit diagram of the starter.

FIG. 6 shows an electrical circuitry of the starter described above. The first stationary contact 11a is electrically connected to the plus terminal of the battery 23, while the second stationary contact 11b is electrically connected through a field coil 13b to the armature 13a of the motor 13. The attracting coil 3a is electrically connected at one end to the second contact 11b and to the holding coil 3b at the other end. A relay 25 includes normally open contacts 25a one of which is electrically connected to the plus terminal of the battery 23 and the other of which is electrically connected to the connection between the attracting and holding coils 3a and 3b. The lead 4d of the normally open switch or temperature sensor 4 is electrically connected to one end of a coil 25b of the relay 25, the other end of the coil 25b being connected through a starter switch 24 to the plus terminal of the battery 23. The other lead 4e of the switch 4 is grounded.

In operation, when the starter switch 24 is closed, the relay coil 25b is energized to close the normally open contacts 25a of the relay, so that DC current now passes through the relay 25 to the attracting coil 3a and the holding coil 3b. Thus, the coils 3a and 3b are energized to move the plunger 7 towards the first and second stationary contacts 11a and 11b. At the same time, the plunger 7 rightwardly pulls the upper end of the lever 21 engaged with the joint section 8 of the plunger 7, so that the lever 21 is rotated about the pivot pin 21a clockwise to axially move the spline tube 15, the unidirectional clutch 16 and thus the pinion 17 towards the ring gear 18.

When the pinion 17 is moved into contact with the ring gear 18, a low-torque rotation of the motor 13 caused by the current passing through the attracting coil 3a cooperates with the axial thrust force applied by the lever 21 to the pinion 17 to bring the pinion into meshing engagement with the ring gear 18. At the same time, the axial thrust force acts through the lever 21 on the plunger 7 to move the same until the movable contact 9 on the end of the plunger 7 is brought into electrical contact with the first and second stationary contacts 11a and 11b to electrically connect them together, so that DC current from the battery flows through the movable contact 9 and the thus closed contacts 11a and 11b to the motor 13. Thus, the armature 13a of the motor 13 is rotated to forcibly rotate the shaft 14. The rotation is transmitted through the spline tube 15 and the unidirectional clutch 16 to the pinion 17 which in turn drives the ring gear 18 to start the engine operation.

After the engine operation has been started, the starter switch 24 will be opened to interrupt the electrical supply to the relay coil 25b, so that the contacts 25a of the relay 25 are moved to their normal open positions whereby the electrical supply to the attracting and holding coils 3a and 3b is interrupted. Thus, the return spring 10 moves the plunger 7 and the lever 21 to their initial positions. Simultaneously, the pinion 17 is moved out of meshing engagement with the ring gear 18. Thus, the engine starting operation has been finished.

In such engine starting operation, if the starter switch 24 could not be turned off in mechanical and electrical points of view, the starter would be operated continuously. In such occasion, the movable contact 9 is kept in contact with the first and second stationary contacts 11a and 11b. Thus, the attracting coil 3a and the second stationary contact 11b are at the same potential, so that no electrical current will pass through the attracting coil 3a. However, current will continuously pass through the holding coil 3b. The temperature of the holding coil 3b will rise with the lapse of time. The normally closed switch or temperature sensor 4 is designed to be opened when the temperature of the holding coil 3b is raised to substantially 100° C. This has been decided for the reason that the temperature sensor 4 must be kept closed for a time period (in general, two minutes) necessary for the starting of the engine, but the sensor 4 should be opened within a time period (about five minutes) within which the unidirectional clutch 16 and the starter motor 13 can be prevented from being damaged by overrunning. The temperature of the holding coil 3b is raised to about 100° C. by a continuous supply of current to the coil for five minutes.

Figure 3:
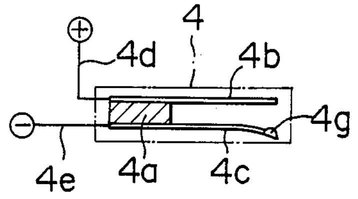
FIG. 3 is similar to FIG. 2 but shows the normally closed switch in its open position.

When the holding coil 3b is heated to a temperature at which the temperature sensor or normally closed, switch 4 is opened, the bimetallic element 4c snaps to move the contact 4g away from the stationary contact 4b, as shown in FIG. 3. Then, the flow of the electrical current through the relay coil 25b is decreased by the PTC heater 4a with a result that the relay contacts 25a are moved to the normally open position to interrupt the electrical supply to the holding and attracting coils 3b and 3a. Thus, the starter operation is stopped to prevent the starter from being damaged by overrun.

At the same time when the bimetallic element 4c snaps to move the movable contact 4g away from the stationary contact 4b, the latter is grounded through the PTC heater 4a, the bimetallic element 4c and the lead 4e. Thus, the PTC heater 4a is immediately heated due to the PTC characteristic thereof to keep the bimetallic element at a temperature higher than a temperature level (about 80° C.) at which the bimetallic element 4c resumes its initial position. Thereafter, therefore, the normally closed switch 4 is kept open even if the temperature of the thus deenergized holding coil 3b is lowered by natural radiation of heat to a level lower than the temperature at which the bimetallic element 4c resumes its initial position. The saturation current passing through the PTC heater 4a at this time is about 15 mA which is greatly lower than 2 A at which the relay 25 is operated.

When the temperature of the holding coil 3b is lowered by natural radiation to a level lower than 80° C. and the started switch 24 is manually opened, the PTC heater 4a of the normally closed switch 4 is deenergized to allow the bimetallic element 4c to be cooled by natural radiation of heat through the holding coil 3b, the retainer member 5 and the cover member 6. When the bimetallic element is cooled to a temperature level lower than 80° C., the bimetallic element returns to its normally closed position to move the movable contact 4g into contact with the stationary contact 4b, so that the starter is ready for re-starting. In general, the starter can be re-started after the lapse of about 10 seconds after the starter switch 24 is turned off.

In the case where the starter switch 24 is repeatedly turned on and off either when the pinion 17 is not well engaged with the ring gear 18 or when the movable contact 9 on the plunger 7 is not brought into a good electrically conductive contact with the first and second stationary contacts 11a and 11b, the attracting coil 3a is fed with electrical current. However, because the current passing through the attracting coil 3a is at a high rate, the attracting coil is heated rapidly. The normally closed switch 4, therefore, is heated by the heat produced in the attracting and holding coils 3a and 3b. Accordingly, the electrical supply to the attracting and holding coils 3a and 3b is interrupted for the same reason as described above. In the case where the normally closed switch 4 is designed to be opened at 100° C., a continuous supply of current at 12 V for about one minute is sufficient to open the normally closed switch 4.

In the described and illustrated embodiment of the invention, the normally closed switch or temperature sensor 4 is disposed in contact with the outer periphery of the holding coil 3b. However, the holding coil 3b may alternatively be disposed radially inwardly of the attracting coil 3a. In such alternative modification, the temperature sensor 4 may be disposed in contact with or adjacent to the outer peripheral surface of the outer attracting coil 3a.

Figure 8:
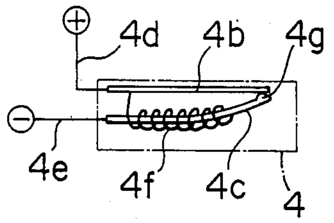
FIG. 8 is similar to FIG. 2 but illustrates a modification to the normally open switch shown in FIG. 2.

FIG. 8 illustrates modification to the temperature sensor 4. In the modification, the PTC heater 4a of the previously described and illustrated embodiment is replaced by a heater formed by a coil 4f wound around the bimetallic element 4c and having ends electrically connected to the stationary contact 4b and the bimetallic element 4c. When the bimetallic element 4c is snapped to move the movable contact 4g, the coil 4f is energized to keep the bimetallic element 4c at a temperature higher than a level at which the bimetallic element is returned to the closed position.

What is claimed is:

1. A starter for an internal combustion engine having a ring gear, said starter including:

a starter switch adapted to be electrically connected to an electrical power source;

a pinion adapted to be axially movable into and out of a meshing engagement with said ring gear;

a plunger for moving said pinion towards said ring gear and having a first movable contact at one end;

first and second stationary contacts both so positioned as to be contacted by said first movable contact;

exciting coil means for moving said plunger towards said first and second stationary contacts, said exciting coil means comprising a holding coil and an attracting coil;

a starter motor adapted to be energized when said first movable contact is moved into contact with said first and second stationary contacts to electrically connect them together, said starter motor being drivingly connected to said pinion;

a temperature sensor disposed in heat conductive relationship with one of said holding and attracting coils;

said holding and attracting coils having windings electrically connected in series with a connection coupled at respective one ends of said holding and attracting coils;

a relay including (a) normally open contacts electrically connected in series to said electrical power and said connection between said windings of said holding and attracting coils, and (b) a third coil electrically connected in series to said starter switch and temperature sensor and energized when said starter switch is turned on to close said normally open contacts;

said temperature sensor being electrically connected in series to said third coil and a ground and comprising a third stationary contact, a bimetallic element having a second movable contact electrically connected to said bimetallic element and so positioned as to be moved by said bimetallic element into and out of contact with said third stationary contact, and an electrically energizable heater disposed in heat conductive relationship with said bimetallic element, said bimetallic element being disposed adjacent to said one of said holding and attracting coils and operative to move said second movable contact away from said third stationary contact when said one of said holding and attracting coils is heated to a first predetermined temperature level, to deenergize said third coil whereby said normally open contacts of said relay are open to interrupt an electrical supply from said power source to said starter motor.

2. A starter according to claim 1, wherein said third stationary contact is electrically connected to said third coil, said bimetallic element is grounded and said heater is electrically connected in series with said third stationary contact and said bimetallic element, said heater having a self-heating characteristic to keep said bimetallic element at a temperature higher than a second predetermined level at which said bimetallic element returns to its initial position, whereby said second movable contact is kept out of contact with said third stationary contact to keep said normally open contacts of said relay open even when the temperature of said one of said holding and attracting coils is lowered to said second predetermined temperature level when said starter switch is kept closed.

3. A starter according to claim 1, further including a retainer member for holding said temperature sensor in a position adjacent to said one of said holding and attracting coils, said retainer member being formed therein with a recess in which said temperature sensor is received, said recess having a bottom face, said retainer member being provided with at least one protrusion operative to keep said temperature sensor spaced a distance from the bottom face of said recess whereby said space is left said temperature sensor and said bottom face of said recess.

4. A starter according to claim 3, wherein said retainer member includes an elastomeric material and said protrusion has a resiliency by which said temperature sensor is resiliently urged into heat-conductive contact with said one of said holding and attracting coils.

5. A starter according to claim 4, wherein said retainer member is further provided with a guide section formed around said recess for retaining said temperature sensor in position.

6. A starter for an internal combustion engine, including:

a starter switch;

a magnet switch including exciting coil means disposed so that when said starter switch is turned on, said exciting coil means are supplied with an electrical current;

a starter motor electrically connected to said magnet switch adapted for driving the engine;

a temperature sensor for detecting the temperature of said exciting coil means, said temperature sensor interrupting the electrical current supplied to said exciting coil means when the temperature of said exciting coil means is raised to a predetermined level; and a retainer member for holding said temperature sensor in position adjacent to said exciting coil means and being shaped such that a space is left between said temperature sensor and said retainer member.

7. A starter according to claim 6, wherein said retainer member has formed therein a recess in which said temperature sensor is received, said recess having bottom face, said retainer member being provided with at least one protrusion for keeping said temperature sensor spaced a distance from the bottom face of said recess whereby said space is left between said temperature sensor and said bottom face of said recess.

8. A starter according to claim 6, wherein said retainer member includes a guide section formed around said recess for retaining said temperature sensor in position.

9. A starter according to claim 7, wherein said retainer member comprises rubber and wherein said protrusion has a resiliency by which said temperature sensor is resiliently urged into heat-conductive contact with an outer periphery of said exciting coil means.

10. A starter according to claim 7, further including electrical leads coupled to said temperature sensor, and wherein said retainer member includes means for protecting said leads.

11. A starter according to claim 7, further including a casing surrounding said exciting coil means and having opening in which said temperature sensor is retained by said retainer member, said retainer member being disposed so that said recess is positioned in said opening and directed towards said exciting coil means, and a cover member disposed in superposed relationship with said retainer member.

12. A starter according to claim 11, wherein said retainer member includes a guide section formed around said recess, said guide section extending into said opening in said casing to retain said temperature sensor in position.

* * * * *